(No Model.)

H. A. STEPHENS.
BALL BEARING.

No. 572,385.             Patented Dec. 1, 1896.

WITNESSES:
L. N. Legendre
Theo. G. Hoster

INVENTOR
H. A. Stephens
BY
Munn
ATTORNEYS.

THE NORRIS PETERS CO., PHOTO-LITHO., WASHINGTON, D. C.

UNITED STATES PATENT OFFICE.

HARRY A. STEPHENS, OF MISSOULA, MONTANA.

BALL-BEARING.

SPECIFICATION forming part of Letters Patent No. 572,385, dated December 1, 1896.

Application filed June 17, 1896. Serial No. 595,839. (No model.)

*To all whom it may concern:*

Be it known that I, HARRY A. STEPHENS, of Missoula, in the county of Missoula and State of Montana, have invented a new and Improved Ball-Bearing, of which the following is a full, clear, and exact description.

The object of the invention is to provide a new and improved ball-bearing which is simple and durable in construction, arranged to reduce friction to a minimum, and designed for use on bicycles and other vehicles and machines. In attaining this end I employ a hub provided in each end with an inwardly-extending bearing, engaging a row of balls mounted to travel in a peripheral groove formed in an annulus or bearing-ring, engaging with its inner surface a second row of balls mounted on a seat formed on the stationary axle.

The invention consists of certain parts and details and combinations of the same, as will be fully described hereinafter, and then pointed out in the claim.

Reference is to be had to the accompanying drawings, forming a part of this specification, in which similar characters of reference indicate corresponding parts in all the figures.

Figure 1:
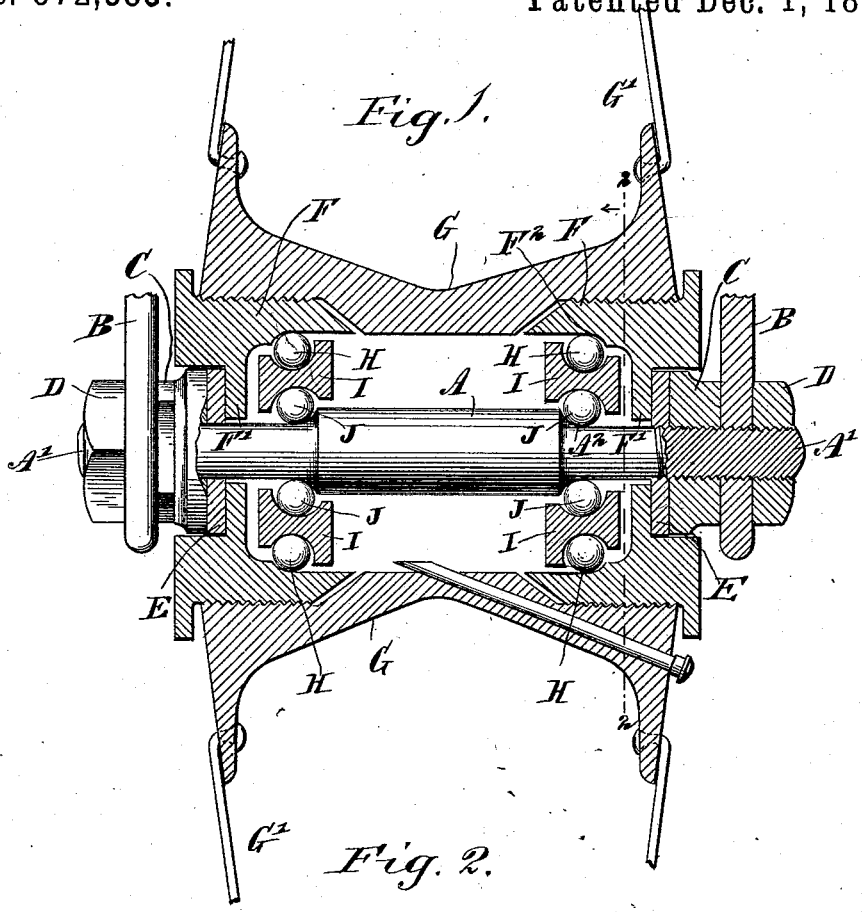
Figure 2:
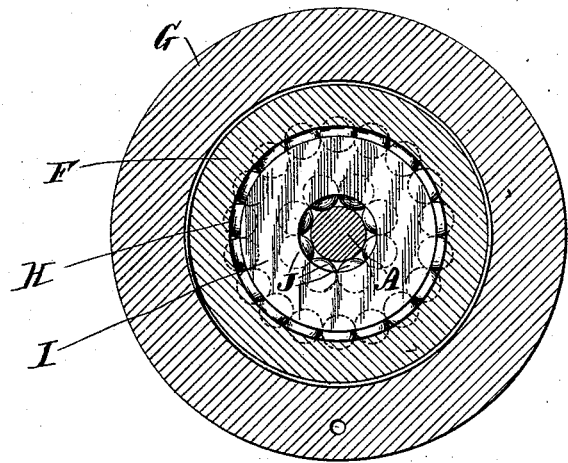

Figure 1 is a transverse section of the improvement as applied on a bicycle-wheel, and Fig. 2 is a sectional side elevation of the same on the line 2 2 of Fig. 1.

The stationary axle A is engaged at its outer threaded portions A' by the members B of the fork of the bicycle-wheel, the said members resting with their inner faces on nuts C, screwing on the said reduced threaded ends A' of the axle. The outer faces of the members B are engaged by nuts D, likewise screwing on the said ends A' to securely hold the axle A rigidly on the members B of the fork.

The inner faces of the nuts C abut against washers E, resting on annular flanges F', formed inwardly on ring-shaped bearings F, screwing into the ends of the hub G, carrying the spokes G' of the wheel. Thus by the arrangement described the washers E firmly close the bearings F and consequently prevent access of dust and other impurities to the inside of the hub, as will be readily understood by reference to Fig. 1.

On the inner surfaces of each of the bearings F is formed a ball-seat $F^2$, engaged by a row of balls H, held in a peripheral groove of an annulus or bearing-ring I, formed with an internal annular groove engaged by a second row of balls J, fitted onto a seat $A^2$, formed by the shoulder connecting the middle large portion of the axle A with the outer reduced end A', as will be readily understood by reference to Fig. 1.

The annulus or bearing-ring I is thus interposed between two rows of balls H and J, so that the said annulus does not come in contact with any of the other parts of the device, as the said annulus is thus freely suspended within the hub G of the wheel.

The shoulders of the seats $F^2$ and $A^2$ are arranged diametrically opposite each other, so that lateral displacement of the annulus or the balls is prevented.

Now by the arrangement described the wheel revolves or runs on the outer row of balls H, and consequently friction is reduced to a minimum in this row of balls over that of the second row of balls J, as the surfaces on each side of the balls in the annulus I are nearly of the same length, while the surfaces for the outer row of balls are not of the same length. Hence when friction is to be overcome in the outer row of balls, then the annulus I and the inner row of balls J, on account of being free to travel, move and hence overcome the friction.

In case a ball should break in one of the rows of balls there is no danger of injury to the wheel, as the latter still turns on the other row of balls.

Having thus described my invention, I claim as new and desire to secure by Letters Patent—

The combination of a hub, an annular bearing secured in each end of the hub, each bearing having an inwardly-extending flange axially orificed and each bearing also having an inwardly-facing shoulder located inward of the respective flanges and forming ball-seats, an axle having reduced ends respectively passed through the orifices of the flanges, the axle having at the inner terminal of each reduced portion an outwardly-facing shoulder forming ball-seats, a fork in which the terminals of the axle are mounted, a nut on each terminal against which nuts the outer sides of the flanges respectively bear, two rings contained within the hub and respectively located adjacent to the flanges of the bearings, each ring having a peripheral groove and an internal groove, one wall of each groove being of increased height to oppose the corresponding shoulders respectively on the bearings and the axle, and antifriction-balls distributed throughout the grooves of the rings and respectively bearing on the seats formed by the shoulders of the axle and bearings, substantially as described.

HARRY A. STEPHENS.

Witnesses:
SAMUEL D. HAYNES,
GEORGE F. BROOKS.